Patented Dec. 3, 1935

2,023,385

UNITED STATES PATENT OFFICE 2,023,385

STABILIZING OILS

Le Roy G. Story, Glenham, N. Y., assignor to The Texas Company, New York, N. Y., a corporation of Delaware No Drawing. Original application August 20, 1931, Serial No. 558,330. Divided and this application June 23, 1934, Serial No. 732,090. In Canada August 16, 1932

6 Claims. (Cl. 44—9)

This invention relates to improvements in stabilizing oils and has to do particularly with the stabilization thereof by the use of oxidation inhibitors.

The fact that certain oils, such as gasoline, especially those containing substantial quantities of unsaturated or cracked hydrocarbons, are unstable in that they tend to undergo changes in composition is quite generally known. These changes are chiefly due to autoxidation reactions whereby there is formed oxidized, condensed and polymerized compounds which either remain in solution or in time separate as gummy deposits. The effect of such changes obviously is undesirable because the utility of the fuel is materially impaired. The reaction products often produce darkening in color and in the case of gasoline a marked increase in the detonating or knocking properties may occur. Furthermore, the gum tends to precipitate as the oil is used whereby the valves as well as other working parts of the engine which come in contact therewith often become carbonized and congested.

In the autoxidation of oils it is quite generally agreed that the oxidation reaction does not commence at once and continue at a uniform rate. On the contrary, there is a certain length of time, depending upon conditions of temperature, light and oxygen concentration in the surrounding atmosphere, when the amount and rate of oxidation is very low. During this interval, commonly called the induction period, a certain potential is gradually built up until a point is reached where the rate of reaction progresses very rapidly thereafter. It is in this second stage of active oxidation that the formation and accumulation of reaction products in the oil chiefly occur.

Oxidation inhibitors have been used heretofore to prevent the oxidation of oils and numerous compounds have been proposed for this purpose. These compounds in general have been thought to function as antioxidants or oxidation preventatives. The antioxidant has usually been dissolved in the fresh oil and its efficiency measured by the extent to which it prolonged the induction period. However, there has been considerable discrepancy in the results obtained with different antioxidants, for whereas a given compound may function satisfactory with one oil it may be practically useless for another and likewise another compound may be an excellent antioxident for the latter oil and have no effect on the former.

It has now been discovered that the difference in activity of various oxidation inhibitors is due to the difference in characteristics of the oils and the selective action of the inhibitors. The cause of this selective reaction, whereby a given inhibitor may be specific in its reaction toward a given oil and indifferent toward another, has been found to be closely related to the oxidation potential or the extent to which the oxidation of the oil has progressed. While, as pointed out heretofore, certain inhibitors are strictly antioxidant, that is, they function best when no oxidation has taken place, others are effective only when a substantial amount of oxidation has taken place, for example, at certain stages in the induction period, or even after the induction period is over and active oxidation is in progress. The latter type of inhibitors, in contrast to the antioxidants, may be termed suppressors because they suppress the oxidation after it has started rather than prevent it from starting.

The use of inhibitors in the prior art, so far as I am aware, has consisted in the employment of a single reagent for a given oil. The inhibitor most effective has been selected and then the efficiency of this material relied upon, when dissolved in the oil, to give maximum protection. Accordingly the limiting feature, aside from an economical consideration, has been the solubility of the compound in the oil. Unfortunately many of the most effective inhibitors are either relatively insoluble, for example, about $\frac{1}{100}$ of one per cent., or on account of other reasons the use of unlimited quantities is often prohibitive. Furthermore, the attention of prior workers has been directed to the use of antioxidants or compounds which completely arrest oxidation and therefore the use of suppressors or compounds that retard the oxidation already in progress has been overlooked.

According to the invention, instead of depending on a single stabilizing agent, a plurality of selected inhibitors is used. By proper selection of a plurality of compounds it is possible to procure a group of materials which will function successively over an extended period of time. This is a distinct advantage when the solubility of a given single compound is relatively small. Furthermore, it is difficult to arrest the oxidation entirely and even if an antioxidant type of compound is used a certain amount of oxidation may still be in progress so that when the antioxidant is used up the induction period will have progressed sufficiently that a material of different activity will be required to retard the reaction. It is often advantageous, therefore, that compounds be selected which will not function simultaneously as would an equivalent quantity of a single given material but instead compounds which will function successively over a series of periods independently of the extent of oxidation that has taken place in the meantime.

In the selection of the compounds to be used, according to the invention, it will be observed that the ideal combination would comprise a mixture having components from three groups of compounds, namely those that prevent oxidation, those that function during the induction period and those that are efficient while active oxidation is in progress. The first group would comprise the antioxidants while probably the second group and especially the third group make up the suppressors. While the invention contemplates broadly the use of any plurality of inhibitors or stabilizing agents which function successively it is important that at least one agent be selected from each of the described types of antioxidant and suppressor inhibitors.

The compounds that are useful, according to the invention, may comprise many of those already known or preferred in the art, but instead of being limited to a definite combination or group of compounds I prefer to make a selection from certain groups. Groups for example that have been found suitable comprise phenols, quinones, amines, the activity of which is thought to be in the order listed. Certain phenols, such as phenol, the cresols, the di- and trihydricphenols are usually highly antioxidant, while quinones and particularly certain amines are suppressive in action. Aldehydes may conveniently be used also or in place of the quinones. It will be understood that the derivatives, such as the alkyl, aryl, acyl, hydrazo, etc. which fill in and overlap among the groups are intended to be included. While no attempt will be made to enumerate or classify all of the substances which are contemplated, the following may be mentioned as examples of those which may be useful; pyrogallol, catechol, resorcinol, alphanaphthol, hydroquinone, ortho-, meta- and para-cresols, ortho-, para- and meta-aminophenols, 2,4-diaminophenol, para-methylaminophenol, para-dimethylaminophenol; para-aminoacetophenone; diaminoacetophenone; beta-hydroxyethyl-aniline, 2-amino-5-hydroxytoluene, hydrazobenzene, benzidene, ortho-, para- and meta-phenylenediamine, guanidine, alphanaphthylamine and diphenylamine.

A feature of the invention is the use of certain dyes in combination with other inhibitors. Not only does a selected antioxidant or mild suppressor which is more active than the dye serve to protect the dye from bleaching as well as the gasoline from oxidizing but also the dye itself acts as a retarder of oxidation and often after the antioxidant is exhausted the dye will function still further to protect the oil. Numerous oil soluble dyes are useful for this purpose and while the employment of certain dyes as inhibitors may already be known in the art, the invention is directed particularly to the use of a combination of a dye and one or more other inhibitors. Indophenol dyes, for example, have been found effective and I may use a phenol, such as pyrogallol or any other suitable material selected from the groups given above in combination with a suitable dye.

While no attempt will be made to explain the reason for the difference in activity of various inhibitors, suffice it to say that the antioxidant type of compounds usually has greater affinity for oxygen. The action of the antioxidants may be in the nature of absorption or addition of oxygen but in the case of the suppressors, a chemical reaction is believed to often take place, whereby the chemical nature of the reagent is materially altered. The latter is particularly evident with those compounds which are effective only after considerable active oxidation has occurred. For example, certain amines, such as para-phenylenediamine, appear to be at least partially converted into a new material and it is possible that this new compound is the active ingredient in its power to suppress oxidation.

In practicing the invention I prefer to select one compound that is antioxidant and one that is suppressor in character, such as phenol and an amine. Combinations of this type may be for example, cresols and para-phenylenediamine; alpha-naphthol and indophenol; or, pyrogallol and alpha-naphthylamine. More effective combinations may contain several different compounds selected from the phenol, quinone and amine groups or their derivatives, such as alpha-naphthol, ortho-aminophenol, hydroquinine and alphanaphthylamine. The quantity of the compounds necessary to be used may vary considerably but in general less than $\frac{1}{10}$ and preferably about 1/100 per cent. by weight of any particular compound is usually sufficient. The material is preferably dissolved in the oil but in some cases it may be desirable to keep the oil in the presence of the undissolved material.

While the invention has been described as particularly useful in connection with the stabilization of gasoline it is to be understood that the invention is not strictly limited to that purpose. The inhibitors described in the foregoing specification may be equally useful for the stabilization of other oils, such as naphtha, kerosene or lubricants.

This application is a division of my co-pending application, Serial No. 558,330, filed August 20, 1931.

Obviously many modifications and variations of the invention, as hereinbefore set forth, may be made without departing from the spirit and scope thereof, and therefore only such limitations should be imposed as are indicated in the appended claims.

I claim:

1. The method of treating cracked petroleum distillates, normally tending to deteriorate and form gum on storage, which comprises incorporating a diaminophenol in the distillate in sufficient amount to retard such deterioration and gum formation.

2. The method of treating cracked petroleum distillates of the class of gasoline and kerosene, normally tending to deteriorate and form gum on storage, which comprises adding to the distillate a small amount of 2,4-diaminophenol whereby such deterioration and gum formation are substantially retarded.

3. The method of treating cracked gasoline, normally tending to deteriorate and form gum on storage, which comprises adding to the gasoline about 0.01% to 0.1% of 2,4-diaminophenol.

4. A cracked petroleum distillate, normally tending to deteriorate and form gum on storage, and containing a diaminophenol in sufficient amount to retard such deterioration and gum formation.

5. A cracked petroleum distillate of the class of gasoline and kerosene, and containing a small amount of 2,4-diaminophenol.

6. A cracked gasoline, normally tending to deteriorate and form gum on storage, and containing 0.01% to 0.1% of 2,4-diaminophenol.

LE ROY G. STORY.